United States Patent [19]

Boesel

[11] 4,435,664
[45] Mar. 6, 1984

[54] MAGNETIC INTERPOLE APPARATUS FOR IMPROVING COMMUTATION CHARACTERISTICS OF A DYNAMOLELECTRIC MACHINE

[75] Inventor: Walter F. Boesel, Palos Verdes Estates, Calif.

[73] Assignee: The Garrett Corporation, Los Angeles, Calif.

[21] Appl. No.: 253,450

[22] Filed: Apr. 13, 1981

[51] Int. Cl.³ .......................................... H02K 27/22
[52] U.S. Cl. .................................. 310/186; 310/187; 310/224
[58] Field of Search ............................. 310/182–184, 310/186–188, 190, 193, 196, 222, 224, 234; 322/6, 66

[56] References Cited

U.S. PATENT DOCUMENTS

| | | | |
|---|---|---|---|
| 472,708 | 4/1892 | Hunter | 310/186 X |
| 751,474 | 2/1904 | Duetsch | 310/68 E |
| 847,088 | 3/1907 | Lincoln | 310/186 |
| 1,685,970 | 10/1928 | Townend et al. | 310/187 |
| 2,378,894 | 6/1945 | Blankenbuehler | 322/65 |
| 2,492,016 | 2/1949 | Stokes | 310/216 |
| 2,798,175 | 7/1957 | Sjokvist et al. | 310/224 |
| 3,242,745 | 3/1966 | Bomberg | 74/5.46 |
| 3,493,831 | 2/1970 | Roberts, Sr. | 310/190 |
| 3,648,089 | 3/1972 | DeWolf | 310/186 |
| 3,761,754 | 9/1973 | Boesel | 310/218 |

FOREIGN PATENT DOCUMENTS

| | | | |
|---|---|---|---|
| 337269 | 5/1959 | Fed. Rep. of Germany | 310/187 |
| 992569 | 5/1965 | United Kingdom | 310/186 |

Primary Examiner—J. D. Miller
Assistant Examiner—D. L. Rebsch
Attorney, Agent, or Firm—Leslie S. Miller; John H. Lynn; Albert J. Miller

[57] ABSTRACT

An interpole for a direct current dynamoelectric machine is provided at the tip thereof with a flux shift winding, or windings, to effect a shifted magnetic flux strength to counteract induced voltages of the commutated armature coils moving through the commutating zone.

34 Claims, 4 Drawing Figures

MAGNETIC INTERPOLE APPARATUS FOR IMPROVING COMMUTATION CHARACTERISTICS OF A DYNAMOLELECTRIC MACHINE

BACKGROUND OF THE INVENTION

1. Field of the Invention

This invention pertains generally to magnetic pole apparatus and is more particularly concerned with dynamoelectric machines provided with what are known as interpoles between the main poles.

2. Description of the Prior Art

In the practice of electrical engineering, it is well known that sparking between the brushes and the commutator of dynamoelectric machines is a problem that can result in reduced life of the brushes and the commutator. Sparking may arise from either or both the effects of armature reaction and self-inductance of armature coils undergoing commutation. To the end of eliminating or reducing this nuisance to the extent practically possible in order to improve brush and commutator life, it has become the practice to employ commutating poles or interpoles disposed between the main field poles of high output direct current machines. Pole face or compensating windings may also be employed if the particular interpole design does not eliminate armature reaction to the extent desired.

The tips of the interpole laminations are shaped in such a way as to give a corrective magnetic flux to counteract the induced voltages in the commutated armature coils as they move through the commutating zone. Calculations of the shape of the pole tip and magnetic strength of the interpole flux are usually based on a linear commutation. That means it is assumed that the current in the coils undergoing commutation changes linearly from the leading edge of the brush from one polarity to the other polarity on the trailing edge of the brush. Because of the symmetry of the assumed current change, no influence of the main field magnetic circuit on the magnetomotive force, or ampere-turns.

In actual operation of symmetric interpoles with assumed linear commutation, sparking nevertheless will occur. In order to get sparkless commutation, the interpole gaps are made smaller by inserting magnetic shims between the poles and the yoke or the frame to give overcompensation, which forces the armature coils to commutate early. However, early commutation upsets the symmetry of the current distribution under the brushes and gives a demagnetizing effect on the main pole windings, which weakens the main pole flux and, especially at weak field, gives a rising speed characteristic with increasing load.

It has been known for a long time that a symmetrically shaped interpoles on machines with a single direction of rotation with a smaller air gap on the trailing edges of the poles will give better commutation and less influence on the main pole strength. This type of interpole air gap gives, in effect, a shift of the centerline of the flux in the direction of rotation with forced commutation at the second half of the interpole, thus restoring linear commutation without the sparking at the trailing edges. Unfortunately, the machine is confined to a single direction of rotation, hence the principle is useless for application where bi-directionality of the machine is a necessity, as for example in vehicular, hoist, and metal-mill applications.

SUMMARY OF THE INVENTION

Accordingly, the invention has for its general object the improvement of the operation of dynamoelectric machines. A principal object is the improvement of the characteristics of commutation of dynamoelectric machines of the direct current type. A further principal object is the provision of means whereby machines of the type aforesaid may be operated over a broad speed range with optimum commutation characteristics in either direction of rotation over a broad range of loads. Also, as will be clear to those skilled in the art, the invention makes it possible to go to higher overloads at higher speed ranges with field weakening without sacrificing speed regulation and commutation, making it especially useful not only on highly loaded traction motors but also on low inertia winder drives, for example, for the metal and paper industries, where these two problems are most pronounced.

Yet a further principal object of the invention is to provide a machine of the type aforesaid with interpole structure in which the magnetic flux distribution across the interpole tip face is controllable to provide a non-uniform flux density from the leading to the trailing edge of the interpole tip. To that end it is an important principal object of the invention to provide a machine of the type aforesaid with interpole structure in which the magnetic flux distribution across the interpole tip face is controllable by auxiliary magnetizing force means on the structure so as to provide in effect a switching of the centerline of the main interpole flux.

A particular object is the provision on machines of the type aforesaid of interpole structure with an auxiliary winding or windings thereon which achieve a virtual asymmetry of the interpole tip with respect to the flux path between the tip and the armature of the machine. It is a further object to provide in such a structure an interpole body element and a pole tip element, wherein one of the pole and tip elements is provided with transverse slot means extending from one face side to another in an axial direction of the machine with an auxiliary winding disposed in the slot and extending around a portion of the interpole structure. A further object is to provide the tip element with the transverse slot means with the auxiliary winding encompassing one face of the tip element and the slot means.

An important object of the invention is to provide on an interpole structure as aforesaid another auxiliary winding disposed in the slot means and encompassing another portion of the tip element. It is yet another object to provide means for coupling the auxiliary windings as aforesaid in circuit with the main interpole winding such that the magnetizing forces of the auxiliary windings are a function of the magnetizing force of the main interpole winding, and, in particular, directly proportional thereto. Further to the object immediately above, it is a further object to provide circuit means for controlling the magnetizing force of one auxiliary winding independently of that of the other auxiliary winding.

Other and other further objects will be apparent at once to those skilled in the art upon examination of the drawings when considered in connection with the description thereof herein told.

DESCRIPTION OF THE PREFERRED EMBODIMENT

Figure 1:
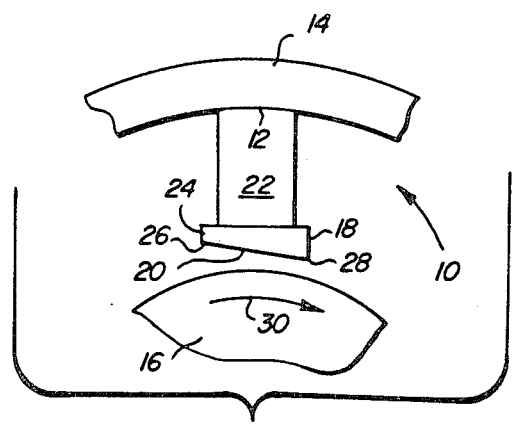
FIG. 1 is a schematic representation in elevation of an interpole structure of the prior art.

Referring to FIG. 1 there is depicted schematically a prior art interpole 10 having an end 12 affixed to the yoke 14 of the stator (not shown) of a dynamoelectric machine having a rotor or armature 16 rotatable about its axis. The other end 18 of the interpole 10 is thus disposed adjacent the armature 16 with the usual air gap intervening between the face 20 of the interpole 10 and the rotatable surface of the armature.

It will be appreciated that although no winding is shown here on the interpole 10, of necessity a magnetizing force means is required to generate or establish a magnetic field flux between the face 20 of the interpole and the armature surface for the usual purpose for which the interpole is intended, as set forth at length hereinabove. The magnetizing force is usually generated by a coil wound around the body 22 of the interpole and coupled in series with the current through the armature as aforesaid.

As practiced in the prior art, the interpole 10 is designed with an unsymmetrical tip 24 defining a leading edge 26 and trailing edge 28 for the directions of rotor rotation indicated by the arrow 30, and wherein the face 20 thereby is forming a non-uniform magnetic flux density. That is, the flux tends to crowd toward the path of least reluctance which is constituted by the shorter air gap distance between the rotor 16 and the trailing edge 28, thus providing a shift of the centerline of the magnetic flux in the direction of rotation in order to restore linear commutation.

This development of an asymmetrical interpole tip does perform rather respectfully to achieve somewhat satisfactory commutation. The arrangement cannot be used where excellent commutation is expected in both directions of rotation, or flat speed/load regulation is necessary, or weak main fields will be used, or relatively small air gaps are implemented to achieve high power to weight ratios. For any of the latter requirements the present invention fills the need.

Figure 2:
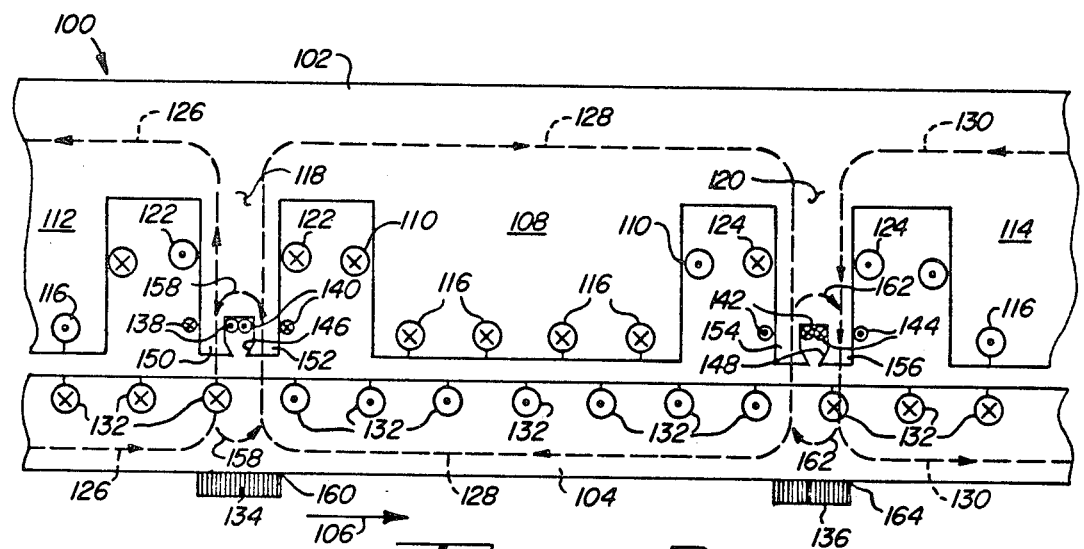
FIG. 2 is a schematic layout of a pole pitch of a direct current dynamoelectric machine incorporating the invention, with flattened frame and armature for clarity.

Referring to FIG. 2 there is depicted schematically one pole pitch of a dynamoelectric machine 100 with a frame or yoke 102 (flattened for clarity) and armature 104 with direction of rotation of the armature relative to the frame indicated by the arrow 106. For convenience of the following description of the machine winding, the machine 100 will be described as if were a direct current motor. Furthermore, the various windings on the machine are shown in conventional fashion as single conductors represented as circles with either a heavy dot or a cross therein. According to prevailing convention, a circle with a dot represents current flowing out of the plane (that is, toward the viewer), while a circle with a cross represents current flowing into the plane (that is, away from the viewer).

The machine 100 has a main pole 108 provided with a field winding 110 which, as depicted, establishes the pole 108 as a north magnetic pole on its end surface facing the armature 104. This flux establishment follows the righthand rule for current flow in the winding 110. Fragmentarily shown are adjacent main poles 112, 114. It will be understood, of course, that if machine 100 is a two pole motor, then pole fragments 112 and 114 are parts of the same main pole. Also, those skilled in the art will recognize that the main pole field windings may be shunt, series, or compound in the case of shunt, series, or compound motors, respectively.

The pole 108 may also be provided with armature reaction compensation or pole face windings 116 which traverse axially through slots in the pole face with return paths in corresponding windings in the adjacent main pole (not shown in full).

Intermediate the main poles 108 and 112, and disposed on the yoke 102, is an interpole 118; likewise an interpole 120 is disposed between main poles 108 and 114. The interpoles 118 and 120 are provided with the usual interpole windings 122 and 124, respectively, which serve as magnetizing force means to establish magnetic flux paths in the yoke 102 and armature 104, as well as in the interpoles 118 and 120 as indicated schematically by the dashed lines 126, 128 and 130 in the direction of the arrows on the lines. These flux paths are the principle paths of the magnetic flux generated by a current source corresponding directly to the current flowing through the windings 132 of the armature 104, preferably configured as coils (e.g., windings 122 and 124) coupled in series with the armature circuit.

Thus, the magnetic flux in paths 126 and 128 enters the pole face of the interpole 118 and the flux in paths 128 and 130 emerges from the pole face of the interpole 120. The flux entering the interpole 118 emerges from the armature from a point electrically opposite a brush 134 which at that point in time is commutating that portion of the armature windings 132 passing through that flux. Likewise, the flux emerging from the pole face of interpole 120 enters the armature at a point electrically opposite a brush 136 which at that point in time is commutating that portion of the armature windings 132 passing through that flux. The foregoing structure and description is that of conventional prior art, and need not be gone into further beyond pointing out that prior art interpoles are provided with asymmetric pole tips (as discussed in length hereinabove) in order to achieve a flux shift away from the centerline thereof in the direction of armature rotation, e.g. that of the arrow 106.

A feature of the present invention is that flux shift of the interpole main flux is accomplished by means other than fashioning the symmetry of the pole tip. Preferably, the flux shift is accomplished by a second magnetizing force means on the interpole to accomplish a shifting of the flux from the main magnetizing force means. The second magnetizing force means preferably comprises electromotive coil means mounted on the interpole and energized by a portion of the current in the armature.

On FIG. 2 this coil means is shown as a pair of coils 138, 140 on interpole 118 and a pair of coils 142, 144 on interpole 120. To this end the interpole 118 and 120 are provided with axially disposed winding slots 146 and 148, respectively, radially depending from the pole tip faces, dividing the ends of the interpole 118 into end portions 150 and 152 and the end of interpole 120 into end portions 154 and 156. The pole face areas of the pole end portions preferably are substantially equal if the machine 100 is to be used in both directions of rotation of the armature 104. Flux shift coils 138 and 140 are disposed about pole end portions 150 and 152, respectively, and coils 142 and 144 about pole end portions 154 and 156, respectively.

With the current flow as shown for the coils 138 and 140, a magnetic flux path 158 is established from the pole end portion 150 across the air gap to the armature 104 and back across the air gap to the pole end portion 152 with a resultant reinforcement of the magnetic flux in the path through the end portion 152 and a diminishment of the magnetic flux in the path 126 through the end portion 150. Consequently, the flux density is greatest at the trailing edge of the end portions 152 and least at the leading edge of the end portion 150.

What is achieved by the novel arrangement is flux density distribution from the leading to trailing edges, which results in a forced commutation at the trailing edge so that the current induced in the armature windings undergoing commutation have had a complete change of polarity by the instant their corresponding commutating bars are uncovered at the trailing edge 160 of the brush 134, resulting in virtually a sparkless condition thereat.

In similar fashion, the flux shift coils 142 and 144 establish a magnetic flux path 162 in the interpole 120 and contiguous portion of the armature 104 to provide the same result at the trailing edge 164 of the brush 136. From the above description it will be apparent at once to those skilled in the art that the invention provides means for achieving the same results with either direction of rotation of the armature, and that all that would be required to achieve these results would be to reverse the direction of current flow in the flux shift coils 138, 140, 142 and 144. It will also be apparent that a broad range of control of the sparking condition where varying parameters of operating conditions exist may be achieved by adjusting or otherwise controlling the amount of current in the flux shift coils, as distinguished from the set conditions brought about by the fixed geometry of structure of the prior art as shown on FIG. 1.

Figure 3:
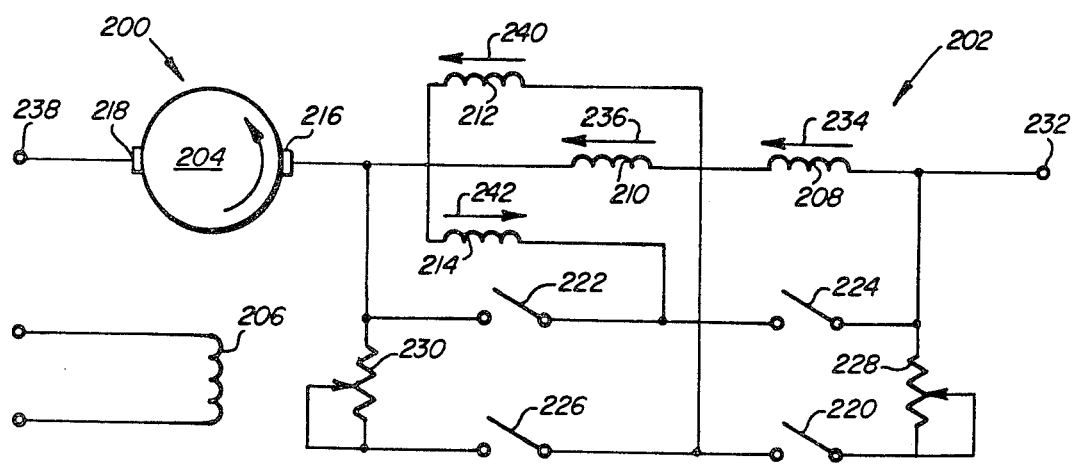
FIG. 3 is a schematic wiring diagram representing one possible control arrangement of one interpole with armature and field coil in the practice of the invention.

Reversing and/or current adjusting can be effected by simple circuit means which might be of the order of that disclosed in the schematic wiring diagram of FIG. 3, wherein the machine 200 is coupled with a control circuit 202 providing both current adjustability of the flux shift coils independently, with a motor reversing feature. For the sake of simplicity the machine 200 is shown as comprising an armature 204 and main pole windings 206. A pole face winding 208 may be provided as well as an interpole winding 210. It will be understood that windings 206, 208 and 210 are merely representative of the actual numbers of poles of any particular machine. The interpole winding 210 is supplemented by the flux shift windings 212 and 214 disposed on the interpole in the manner described hereinabove. A pair of brushes 216 and 218 are shown as coupled to the armature 204.

The control circuit shown comprises four switches 220, 222, 224 and 226 and two adjustable resistors 228 and 230. Electric power from the mains (not shown) is applied to the machine 200 and control circuit 202 at the terminal 232. Electric current flows through the pole face winding 208 and the interpole winding 210 (as shown by arrows 236 and 238) and thereafter through the armature 204 by way of brushes 216 and 218 to the terminal 238 to be returned to the mains. It will be understood that the main pole winding 206 may be coupled in the circuit in accordance with whether the machine 200 is series, shunt, or compound wound, as well understood in the art.

With switches 220 and 222 closed, current from the terminal 232 will also flow through the adjustable resistor 228, switch 220, flux switch coils 212 and 214 in the direction of the arrows 240 and 242, and switch 222 to the terminal 238 by way of the brush 216, armature 204 and brush 218. Since the series circuit of resistor 228, switch 220, flux switch coils 212 and 214 and the switch 222 is coupled in parallel with the series circuit of the pole face and interpole windings 208 and 210, the current through the flux switch coils will be directly proportional to the current through the interpole winding.

When the machine 200 is to be reversed, as for example by reversing the main pole winding 206, the switches 220 and 222 are opened and switches 224 and 226 are closed. In that event the current in the circuit 202 flows from the terminal 232 through switch 224, flux switch windings 214 and 212 in the reverse direction of the arrows 242 and 240, switch 226 and resistor 230 to the terminal 238 by way of the brush 216, armature 204 and brush 218. Since the resistors 228 and 230 are independently adjustable, the degree of flux switch may be controlled as necessary for the complete range of motor speeds and loads.

Figure 4:
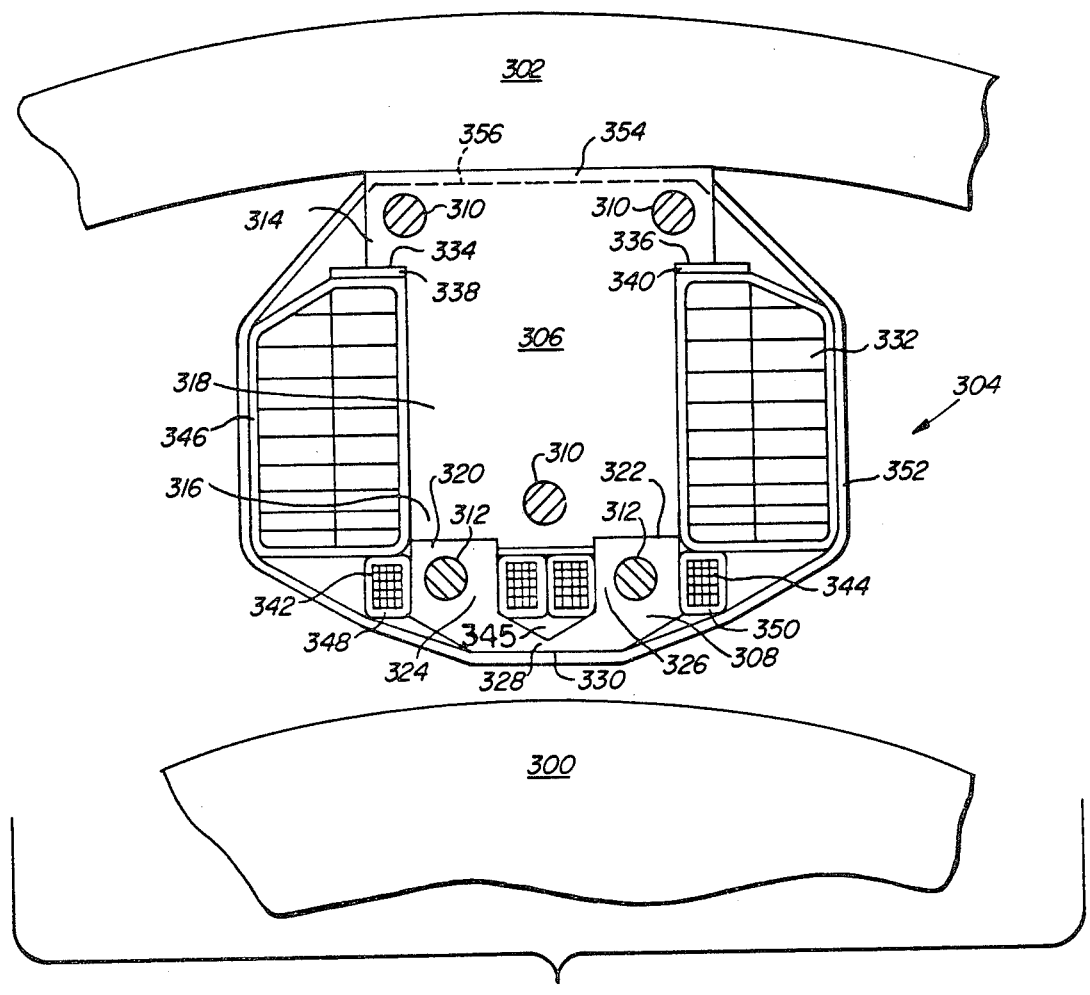
FIG. 4 is an elevation view in cross-section of one possible interpole arrangement.

Referring now to FIG. 4 there is depicted one possible arrangement which would make it possible to wind the shift coils in coil winding machines, insulate them properly to ground, place them at the detachable pole tip having a saturable center section and fit the subassembly on the interpole body with the interpole winding in place. The whole assembly of interpole body with its winding and the pole tip its flux shift windings may be held together with fiberglass bandings which are layed in suitable grooves made of shorter laminations of the pole stack. Thereafter the assembly is secured to the yoke of the machine. The banding with fiberglass bands as aforesaid will be described in greater detail hereinafter.

The fixing of the various parts of the interpole assembly in place by means of fiberglass bandings at suitable spaced distances along the length of the assembly is merely one assembly procedure which could be used. It is apparent that this simple banding procedure is not essential to, nor does it form a part of the invention since other assembly procedures could be utilized, as will be well understood by those skilled in the art. For example, the parts might be secured by the method disclosed in my prior U.S. Pat. No. 3,761,754 dated Sept. 25, 1973 on an invention entitled "Dynamoelectric Machine Field Structure and Method for Forming".

FIG. 4 shows schematically a fragment of a rotor 300 disposed for rotation within a yoke 302 of dynamoelectric machine (not otherwise shown). Intermediate the rotor 300 and the yoke 302 is an interpole assembly 304 secured to the yoke by any desired means (not shown). One such attachment means is shown as a bolt disposed in a counterbored hole in the yoke in my aforesaid U.S. Pat. No. 3,761,754.

The interpole assembly 304 comprises a pole body element 306 and a pole tip element 308, each of the said elements being formed of stacks of laminations with the stacked laminations of the body element 306 being secured together by bolts or rivets 310, preferably insulated from the pole laminations, and the stacked laminations of the tip element 308 being secured together by bolts or rivets 312, also similarly insulated, all in a fashion well known in the art. It will be recognized that the total axial length of the lamination stacks of the elements 306 and 308 is equal to the axial length of the lamination stack of the rotor 300. In typical cases these stacks might comprise laminations of thickness of 0.025 to 0.040 inches to a total stack length essentially of the same axial length as the armature, depending on the size of the machine.

The body element 306 defines a base end 314 and a tip receiving end 316 spaced apart by pole portion 318. Certain ones of the laminations in the stack comprising the body element 306 are slightly shorter than neighboring ones at the base end 314 in order to accommodate fiberglass bandings intermediate the pole body and the yoke. At the tip receiving end 316 the body element 306 is formed with small stepped portions 320 and 322 to receive and provide positioning of the spaced apart tip leg ends 324 and 326 of the pole tip element 308. The tip leg ends merge at a saturable reduced section 328 to form a smooth continuous pole face 330. But they might be formed by two separate pieces with a small air-gap at the centerline of the interpole.

A main interpole winding 322 is disposed about the pole portion 318 abutting the shoulders 334 and 336 of the base end 314 of the body element 306, with insulating spaces 338 and 340 interposed therebetween. Flux shift coils 342 and 344 are disposed about the tip leg ends 324 and 326, respectively, of the tip element 308, traversing the winding slot 345 therebetween. A sheath or tape wrapping 346 disposed about the winding 332 and similar sheath or tape windings 348 and 350 disposed about the coils 342 and 344, respectively, provide insulation therefor as is well known in the art. Fiberglass banding 352 about the pole assembly 304 serves to secure together the various parts of the interpole assembly 304 and secures the coils tightly to the pole against high magnetic forces during heavy overload conditions, and for final step positioning of the assembly on the stator 302.

Banding as aforesaid is accomplished by employing a readily available preimpregnated, parallel laid fiberglass tape of about 0.010 inches thickness and appropriate width, winding on four or five turns to achieve the desired strength for the purpose. It is obvious, of course, that the least total thickness is desirable since the tape band occupies space between the yoke and interpole which is in the pathway for the magnetic flux established by the interpole, as shown by paths 126, 128 and 130 on FIG. 2. The aformentioned groove formed by lamination shorter than their neighboring ones is illustrated by the spacing indicated by the reference numeral 354 on FIG. 4, with the said shorter laminations having their base ends terminating at the dashed line 356. Where the total length of the interpole lamination stack is 8 inches or less, two bandings should be sufficient. Stacked lengths greater than 8 inches would probably require three or more bands, spaced every four to six inches apart. It is obvious that the least number of bandings is to be preferred in order to hold the magnetic path reluctance to a minimum. Magnetic and/or non-magnetic shims between pole 306 and frame 302 to adjust the interpole magnetic strength are not shown.

In the course of assembly one lead (not shown) of the flux shift coil 342 is coupled to a similar lead (not shown) of the flux shift coil 344 in such manner that the magnetizing forces of the coils may combine to establish magnetic flux polarity as shown, for example, by the coils 138 and 140 on FIG. 2. It will be noted that the saturable reduced section 328 of the pole element 308 effectively serves to limit the threading of the flux therethrough between the pole tip ends 324 and 328, thus assuring a completion of a flux path (for example, from the tip end 324 across the air gap to the armature to link the windings therein undergoing commutation and back across the air gap to the tip end 326) through the adjacent armature windings for the purpose stated.

FIG. 4 is presented as a basis for calculating and configuring the ampere-turns ratio of the flux shift coils to that of the main interpole windings. In general, the ratio is substantially that of the areas of the coils to the main interpole winding. FIG. 4 is about on a scale of 1:1 for electric motors now in production, so if the flux coils are connected in series as shown on FIG. 3 and coupled in parallel with the interpole winding (and the pole face windings, if used), by simple scaling of the drawing it becomes evident that the ratio of the combined areas of the coils to the area of the interpole winding is of the order of about 1:13, hence the general rule of the ratio of ampere-turns can be the same. It will be evident, of course, that the particular ratio selected for disclosure on FIG. 4 is arbitrary, and that different ratios may be employed for dynamoelectric machines of various purposes. It is only suggested, however, that the range of such ratios would probably be somewhere between 1:50 to 1:10, but not precluding possible future developments which would place the requirement in a range outside of either the lower or higher ratios given.

It is now apparent that a novel structure has been disclosed to achieve the same function as the non-symmetric interpoles of the prior art without the usual limitations interposed by such prior art structure. It is also apparent that a simple reversal of the current through the flux shift coils makes for motor reversibility, and that the control of the current in each of the flow directions makes for flexibility of control.

I claim:

1. Magnetic interpole apparatus for improving commutation characteristics of a dynamoelectric machine comprising:
   (a) magnetizable interpole means having one end arranged for coupling to the yoke of said dynamoelectric machine and the other end providing a pole tip extending radially toward the axis of said machine, said pole tip having a first pole tip portion including a leading edge and a second pole tip portion including a trailing edge and winding slot means traversing in an axial direction from one side to another of said pole tip between said first and second pole tip portions;
   (b) magnetizable force means associated with said magnetizable interpole means and arranged to establish therein a first magnetic flux defining a magnetic pole on said pole tip;
   (c) flux shift winding means disposed in said winding slot means and encompassing one of said first and second pole tip portions; and
   (d) means for coupling said flux shift winding means to an electric current source to generate in said one of said first and second pole tip portions a second magnetic flux for altering the flux distribution therein of said magnetic interpole means established by said magnetizing force means.

2. The apparatus of claim 1 in which said magnetizable force means comprises pole magnetizing winding means on said interpole means, said winding means being coupled to an electric current source.

3. The apparatus of claim 2 in which both said pole magnetizing winding means and said flux shift winding means are provided to the same current source.

4. The apparatus of claim 3 in which said winding means are coupled in parallel so that current in said flux shift winding means is proportional to the current in said pole magnetizing winding means.

5. The apparatus of claim 1 in which the current through said flux shift winding means is directed such that the magnetic flux generated thereby increases said magnetic field flux in said one of said pole tip portions.

6. The apparatus of claim 1 in which the current through said flux shift winding means is directed such that the magnetic flux generated thereby decreases said magnetic field flux in said one of said pole tip portions.

7. Magnetic pole apparatus for a dynamoelectric machine comprising:
(a) magnetizable pole means having one end arranged for coupling to the yoke of the dynamoelectric machine and the other end providing a pole tip extending toward the rotor of the machine, said pole tip defining a winding slot traversing from one side to another thereof;
(b) pole magnetizing means associated with said magnetizable pole means and arranged to establish therein a magnetic field flux of substantially uniform flux density from said one end to said pole tip of said magnetizable pole means;
(c) first flux shift winding means disposed in said winding slot and encompassing a first portion of said pole tip;
(d) second flux shift winding means disposed in said winding slot and encompassing a second portion of said pole tip; and
(e) means for coupling both said flux shift winding means to an electric current source to generate in said portion of said pole tip magnetic fluxes for altering the flux density therein established by said pole magnetizing means, the alteration of the magnetic field flux in said first pole tip portion by the magnetic flux generated by said first flux shift winding means differing from the alteration of the magneic field flux in said second pole tip portion by the magnetic flux generated by said second flux shift winding means.

8. The apparatus of claim 7 in which the current through said first flux shift winding means is directed such that the magnetic flux generated thereby increases said magnetic field flux in said first portion of said pole tip, and the current through said second flux shift winding means is directed such that the magnetic flux generated thereby decreases said magnetic field flux in said second portion of said pole tip.

9. The apparatus of claim 8 in which said pole magnetizing means comprises a magnetizing winding on said pole means, said apparatus further comprising means for coupling said magnetizing winding to an electric current source.

10. The apparatus of claim 9 in which both said flux shift winding means are coupled in a series circuit with said series circuit coupled in parallel to said magnetizing winding, all being coupled thereby to the same current source.

11. The apparatus of claim 8 in which said first portion of said pole tip is a trailing edge of said magnetizable pole means and said second portion of said pole tip is a leading edge of said magnetizable pole means.

12. The apparatus of claim 1 in which said magnetizable interpole means comprises:
(a) a pole tip body element defining at one end thereof said one end of said magnetizable interpole means; and
(b) a pole tip element defining at one end thereof said other end of said magnetizable interpole means, said elements being secured together with the other ends thereof in faying relationship, said winding slot traversing said pole tip element from side to side thereof and directed axially of the machine, and opening on to said other end of said pole tip body element.

13. The apparatus of claim 12 in which said winding slot traverses said pole tip element, said one end of said pole tip element defining with said winding slot a magnetically saturable pole tip portion contiguous to and coextensive with said winding slot, said one end of said pole tip element having a substantially uninterrupted face extending from said leading to trailing edges thereof.

14. The apparatus of claim 12 in which said winding slot traverses said pole tip element, said one end of said pole tip element defining with said winding slot a magnetically saturable pole tip portion contiguous to and coextensive with said winding slot, said one end of said pole tip element having an interrupted face with a saturable section extending from said leading to trailing edges thereof.

15. A direct current dynamoelectric machine comprising:
(a) stator means having a yoke for a magnetic flux path;
(b) rotor means rotatably disposed within said stator means;
(c) magnetizable interpole means for improving commutation characteristics of said machine, said interpole means having one end secured to said yoke, the other end thereof defining a pole tip extending toward said rotor means to define therewith a substantially uniform gap for the passage of magnetic flux between the end face of said pole tip and said rotor means, said pole tip having a first pole tip portion and a second pole tip portion;
(d) magnetizing force means on said magnetizable interpole means for establishing a magnetic field flux from said yoke through said magnetizable interpole means and thence from said pole tip through said first and second pole tip portions across said gap into said rotor means; and
(e) flux shifting means on said magnetizable interpole means adjacent said pole tip for altering the flux density of a portion of said pole tip so that said first pole tip portion has a flux density different from the flux density through said second pole tip portion, and thus altering the magnetic field flux distribution established by said magnetizable force means across said gap between said pole tip portion and said rotor means.

16. The machine of claim 15 in which said flux shifting means comprises another magnetizing force means for establishing an alteration of magnetic flux within said pole tip portion.

17. The machine of claim 15 in which said magnetizing force means comprises a pole winding disposed on said interpole means, said flux shifting means comprising a flux shift coil disposed on at least one of said pole tip portions, and said rotor means comprises load windings coupled to both said pole winding and said flux shift coil.

18. The machine of claim 17 in which said pole winding and said flux shift coil are coupled in parallel and in series with said load winding.

19. The machine of claim 17 having circuit control means coupled with said flux shift coil for controlling the current therethrough.

20. The machine of claim 17 having switch means for reversing the direction of current in said flux shift coil.

21. The machine of claim 15 in which said flux shifting means comprises first and second flux shift coils, one of said coils being arranged on said first pole tip means adjacent said pole tip for altering the flux density of said first pole tip portion and thus altering the magnetic flux distribution established by said magnetizing force means across said gap between said first pole tip portion and said rotor means, the other of said coils being arranged on said second pole tip means adjacent said pole tip for altering the flux density of said second pole tip portion and thus altering the magnetic flux distribution established by said magnetizing force means across said gap between said second pole tip portion and said rotor means.

22. Magnetic interpole apparatus for improving commutation characteristics of a dynamoelectric machine comprising:
   (a) magnetizable pole means having a pole face defining first and second pole face portions;
   (b) first magnetizing force means on said magnetizable pole means, said first magnetizing force means establishing a first magnetic field flux in said magnetizable pole means, said first flux being manifest at both said pole face portions; and
   (c) second magnetizing force means on said magnetizable pole means, said second magnetizing force means establishing a second magnetic field flux in said magnetizable pole means, said second flux being manifest at one of said pole face portions, whereby the net magnetic flux manifest at said one of said pole face portions is the magnetic resultant of the combination of said first and second magnetic field fluxes thereat.

23. The magnetic interpole apparatus of claim 22 in which said second magnetizing force means is oriented on said magnetizable pole means so as to effect a direction of said second magnetic field flux relative to the direction of said first magnetic field flux such that the resultant flux density manifest at said one of said pole face portions is more than the flux density manifest at the other of said pole face portions.

24. The magnetic interpole apparatus of claim 22 in which said second magnetizing force means is oriented on said magnetizable pole means so as to effect a direction of said second magnetic field flux relative to the direction of said first magnetic field flux such that the resultant flux density manifest at said one of said pole face portions is less than the flux density manifest at the other of said pole face portions.

25. The magnetic interpole apparatus of claim 22 in which said second magnetizing force means is a function of said first magnetizing force means.

26. The magnetic interpole apparatus of claim 22 in which said second magnetizing force means is directly proportional to said first magnetizing force means.

27. The magnetic interpole apparatus of claim 22 in which the face areas of said pole face portions are substantially equal.

28. The magnetic interpole apparatus of claim 22 further comprising third magnetizing means on said magnetizable pole means and adapted to establish a third magnetic field flux in said magnetizable pole means and manifest at the other of said pole face portions, whereby the magnetic flux manifest at said other of said pole face portions is the magnetic resultant of the combination of said first and third magnetic field fluxes thereat, and differs from the magnetic resultant of the combination of said first and second magnetic field fluxes manifest at said one of said pole face portions.

29. The magnetic interpole apparatus of claim 28 in which said third magnetizing force means is a function of said first magnetizing force means.

30. The magnetic interpole apparatus of claim 28 in which said third magnetizing force means is directly proportional to said first magnetizing force means.

31. The magnetic interpole apparatus of claim 28 in which the face areas of said pole face portions are substantially equal.

32. The magnetic interpole apparatus of claim 22 in which said second magnetizing force means is oriented on said magnetizable pole means so as to effect a direction of said second magnetic field flux relative to the direction of said first magnetic field flux such that the resultant flux density manifest at one of said pole face portions is less than the flux density manifest at the other of said pole face portions.

33. The machine of claim 21 having switch means for reversing the current in one of said flux shift coils.

34. The machine of claim 21 having switch means for reversing the current in both of said flux shift coils.

* * * * *